United States Patent [19]
Eschbach et al.

[11] Patent Number: 5,363,209
[45] Date of Patent: Nov. 8, 1994

[54] IMAGE-DEPENDENT SHARPNESS ENHANCEMENT

[75] Inventors: Reiner Eschbach, Webster; William A. Fuss, Rochester, both of N.Y.

[73] Assignee: Xerox Corporation, Stamford, Conn.

[21] Appl. No.: 147,612

[22] Filed: Nov. 5, 1993

[51] Int. Cl.$^5$ ............................................. H04N 1/40
[52] U.S. Cl. .................................. 358/445; 358/447; 358/518
[58] Field of Search ............... 358/445, 447, 518, 520, 358/522, 532, 296, 298; 348/252, 253, 625, 627, 630, 631; 382/17, 22; H04N 1/46, 1/40

[56] References Cited

U.S. PATENT DOCUMENTS

| | | | |
|---|---|---|---|
| 4,745,465 | 5/1988 | Kwon | 358/252 |
| 5,045,952 | 9/1991 | Eschbach | 358/447 |
| 5,087,972 | 2/1992 | Sumi | 348/625 |
| 5,134,667 | 7/1992 | Suzuki | 358/520 |
| 5,247,352 | 9/1993 | Nagler et al. | 348/630 |
| 5,285,220 | 2/1994 | Suzuki et al. | |

OTHER PUBLICATIONS

R. C. Gonzales and B. A. Fittes, "Gray level transformation for interactive image enhancement," Proc. Second Conference on Remotely Manned Systems, 1975.
E. L. Hall, "Almost uniform distributions for computer image enhancement," IEEE Trans. Comput. C-23, 207-208, 1974.
W. K. Pratt, *Digital Image Processing*, Wiley, New York, 1978.
M. P. Ekstrom, *Digital Image Processing Techniques*, Academic Press, Orlando, 1984 (J.S. Lim).
J. C. Russ, *The Image Processing Handbook*, CRC Press Boca Raton, 1992.
R. C. Gonazalez and P. Wintz, "Image Enhancement by Histogram Modification Techniques", *Digital Image Processing*, Addison-Wesley Publishing, 1977, p. 118 et seq.
Pizer et al. "Adaptive Histogram Equalization and its Variations", Computer Vision, Graphics, and Image Processing, 39, 355-368 (1987), pp. 355-369.
"Xerox Color Encoding Standard," XNSS 289005, 1989.

*Primary Examiner*—Edward L. Coles, Sr.
*Assistant Examiner*—Kim Yen Vu
*Attorney, Agent, or Firm*—Mark Costello

[57] ABSTRACT

A method of altering the sharpness in the reproduction of an electronically encoded natural scene image, including process steps of: a) converting the signals to a luminance-chrominance signal format, wherein at least one signal represents overall image intensity; b) determining the maximum local contrast within the image; c) determining a filter function applicable to the image which increases maximum local contrast to a predetermined target value, and all other contrast to an amount proportional thereto; and d) applying the determined filter function to the image to increase sharpness thereof.

40 Claims, 7 Drawing Sheets

FILTER

| 0 | $-\beta$ | 0 |
|---|---|---|
| $-\beta$ | $\alpha$ | $-\beta$ |
| 0 | $-\beta$ | 0 |

*FIG. 4A*

| 0 | $-\frac{1}{2}$ | 0 |
|---|---|---|
| $-\frac{1}{2}$ | 3 | $-\frac{1}{2}$ |
| 0 | $-\frac{1}{2}$ | 0 |

*FIG. 4B*

IMAGE-DEPENDENT SHARPNESS ENHANCEMENT

The present invention is directed toward a method and apparatus for improving the appearance of a digitally encoded image having a pictorial scene, and more particularly, toward a method for improving sharpness within a digitally encoded image having a pictorial scene.

CROSS REFERENCE

Cross reference is made to the following co-pending applications: U.S. Ser. No. 08/131,172, filed Oct. 4, 1992, entitled "Image-Dependent Color Shifting of Strongly Color Shifted Images", by R. Eschbach (assigned to the same assignee as the present application); U.S. Ser. No. 08/132,973, filed Oct. 7, 1993, entitled "Image-Dependent Exposure Enhancement", by R. Eschbach, (assigned to the same assignee as the present application); U.S. Ser. No. 08/133,231, filed Oct. 7, 1993, entitled "Image-Dependent Luminance Enhancement", by R. Eschbach et al, (assigned to the same assignee as the present application); U.S. Ser. No. 08/139,660, filed Oct. 22, 1993, entitled Image-Dependent Color Correction Using Black Point and White Point in a Natural Scene Pictorial Image", by R. Eschbach (assigned to the same assignee as the present application); and U.S. Ser. No. 08/147,614, filed Nov. 5, 1993, entitled "Cascaded Image Processing Using Histogram Prediction", by W. A. Fuss et al., (assigned to the same assignee as the present application).

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality. One very common set of input documents includes photographs. Unfortunately, photography is an inexact science, particularly among amateurs, and original photographs are often poor. Alternately, technology, age or image degradation variations often result in pictures having an unsatisfactory and undesirable appearance. What is desired then, is a copy giving the best possible picture, and not necessarily a copy of the original.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

Three possible choices are presented by the art in the area of image enhancement. In the first case, we can do nothing. Such a system is a stable system, in that it does no harm to an image, but its output documents are sometimes not satisfactory to the ultimate customer. This is a common approach taken to reproduction.

In a second case of image enhancement, the image can always be processed. It turns out than an improvement can usually be made to an image if certain assumptions are made that are accurate for most cases. In an exceptionally large set of images, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further the process may undesirably operate on those images which are good ones.

Accordingly, we arrive at our third case of image enhancement, a process of automated image enhancement which operates to vary images which are not perceived as good images, but does not operate on images which do not need to be improved, thereby allowing a stable process.

One improvement that can be made to an image is to correct the sharpness of the image. A common deficiency of digitally represented images, and images in general, is that sharpness is less than would be considered "good" in terms of image appearance. This discrepancy might be caused by a slightly out of focus image scan, by a bad original photograph, or simply by the expectations and preferences of the user. While it is not proposed to measure and correct actual blur in the image, like focus and motion blur, the image can be changed to meet user expectations independently of the actual sharpness of the image. As noted above, it is also important that this function be accomplished in such a way that subsequent sharpness enhancement operations not result in further image modification.

One way of characterizing a lack of sharpness is that there is a lack of high contrast in local areas of the image. However, the maximum local contrast of the image provides some information about the lack of sharpness, and accordingly about a filter to correct lack of sharpness. Another characterization of lack of sharpness is that an image requires fine detail in some portion of the image in order to be considered sharp. Consider for a moment a comparison of finely detailed object with a high number of edges and a face. Even though a perfectly focused face lacks edges, somewhere in the image there will be some object, perhaps a reflection in the eyes, fine hair, etc, which can give a measurement of the maximum existing contrast in the image.

The references cited are herein incorporated by reference.

SUMMARY OF THE INVENTION

In accordance with the invention, there is provided a method of altering the sharpness in the reproduction of an electronically encoded natural scene image.

In accordance with one aspect of the invention, there is provided a method of altering the sharpness in the reproduction of an electronically encoded natural scene image, including process steps of a) converting the signals to a luminance-chrominance signal format, wherein at least one signal represents overall image intensity; b) determining the maximum local contrast within the image; c) determining a filter function applicable to the image which increases maximum local contrast to a predetermined target value, and all other local contrasts to an amount proportional thereto; d) applying the determined filter function to the image to increase sharpness thereof.

In accordance with another aspect of the image, a prefiltering step is included in the image, filtering the image with a high pass filter, and subsequently operating on the image with the sharpness enhancing method, and optionally with a noise filter.

In accordance with yet another aspect of the invention, maximum local contrast may also be determined as a function of several local determinations averaged in a weighted fashion over a larger area.

The invention is operative to determine local area contrast and increase it to a predetermined target value, thereby increasing apparent sharpness.

These and other aspects of the invention will become apparent from the following descriptions used to illustrate the preferred embodiment of the invention, read in conjunction with the accompanying drawings in which:

FIG. 4A shows the desired 3×3 filter, and FIG. 4B shows the calculated 3×3 filter;

FIG. 5A shows a sharpened edge in a document, while

Figure 6:
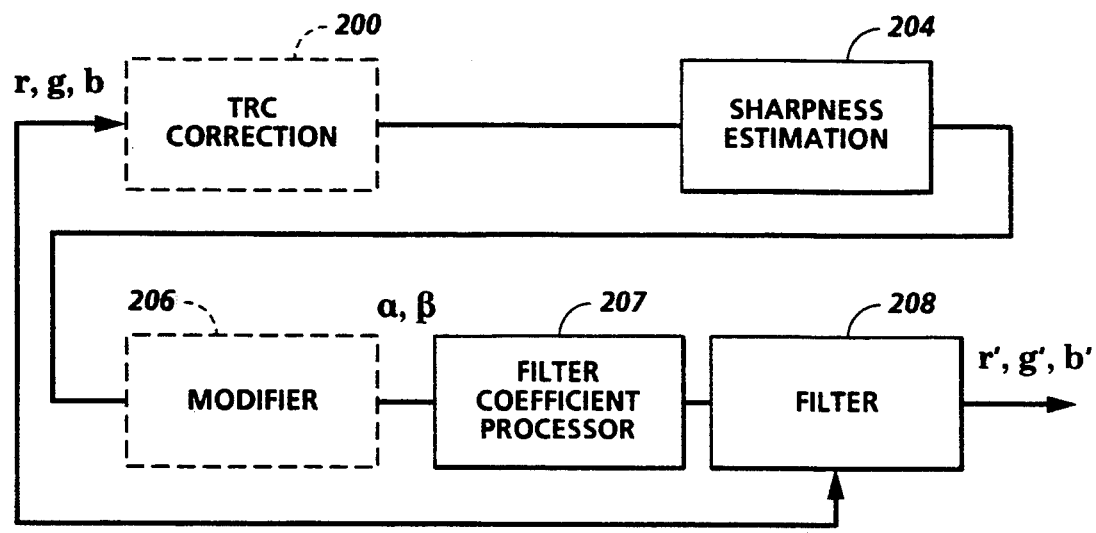
Figure 7:
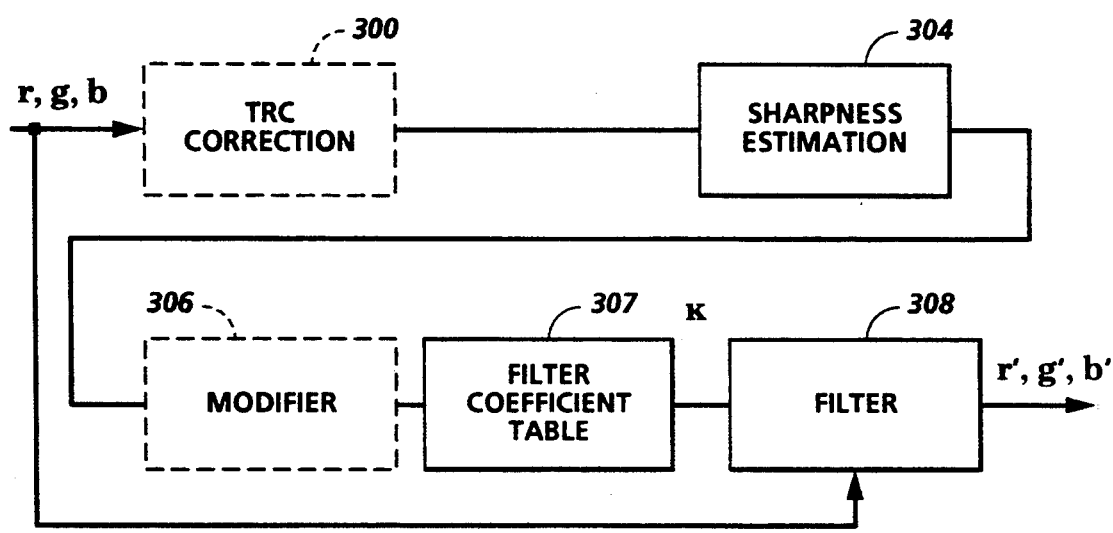
Figure 8:
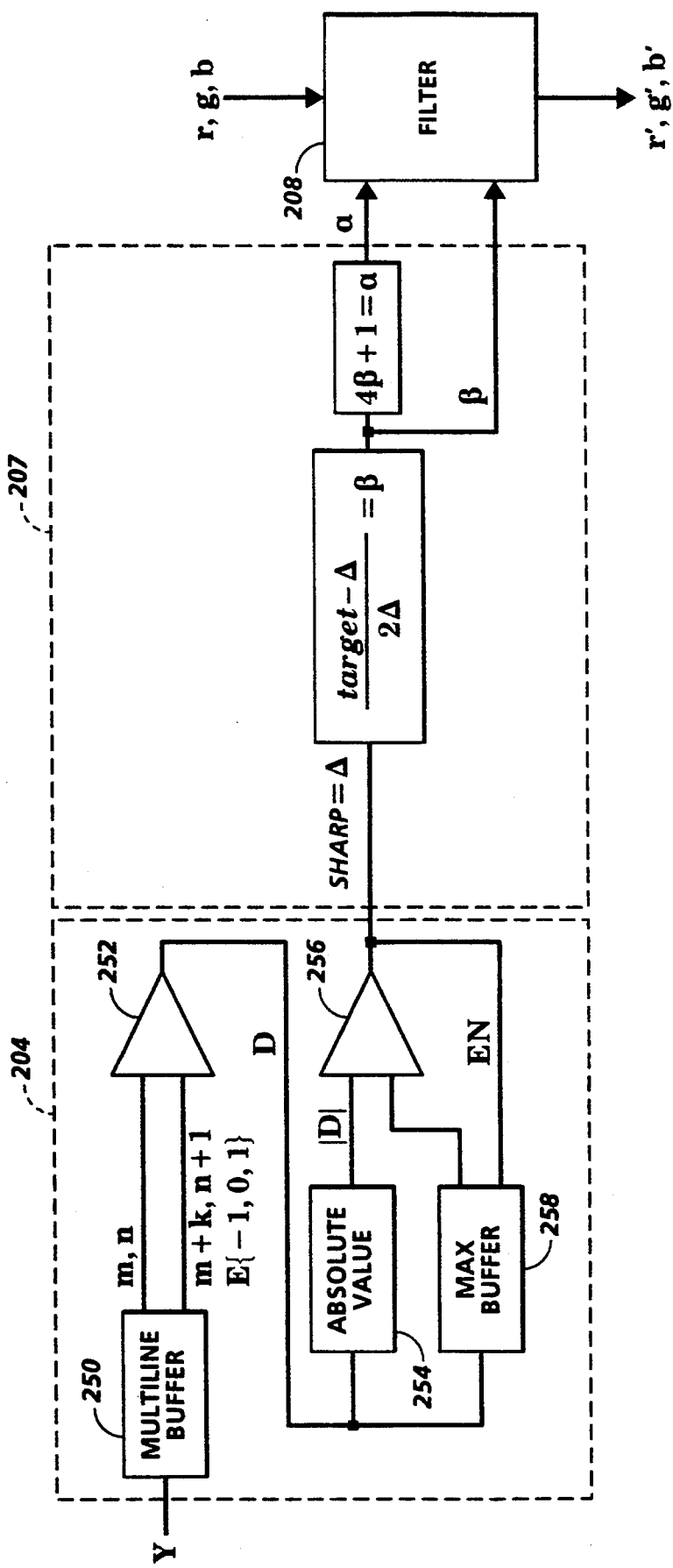
Figure 9:
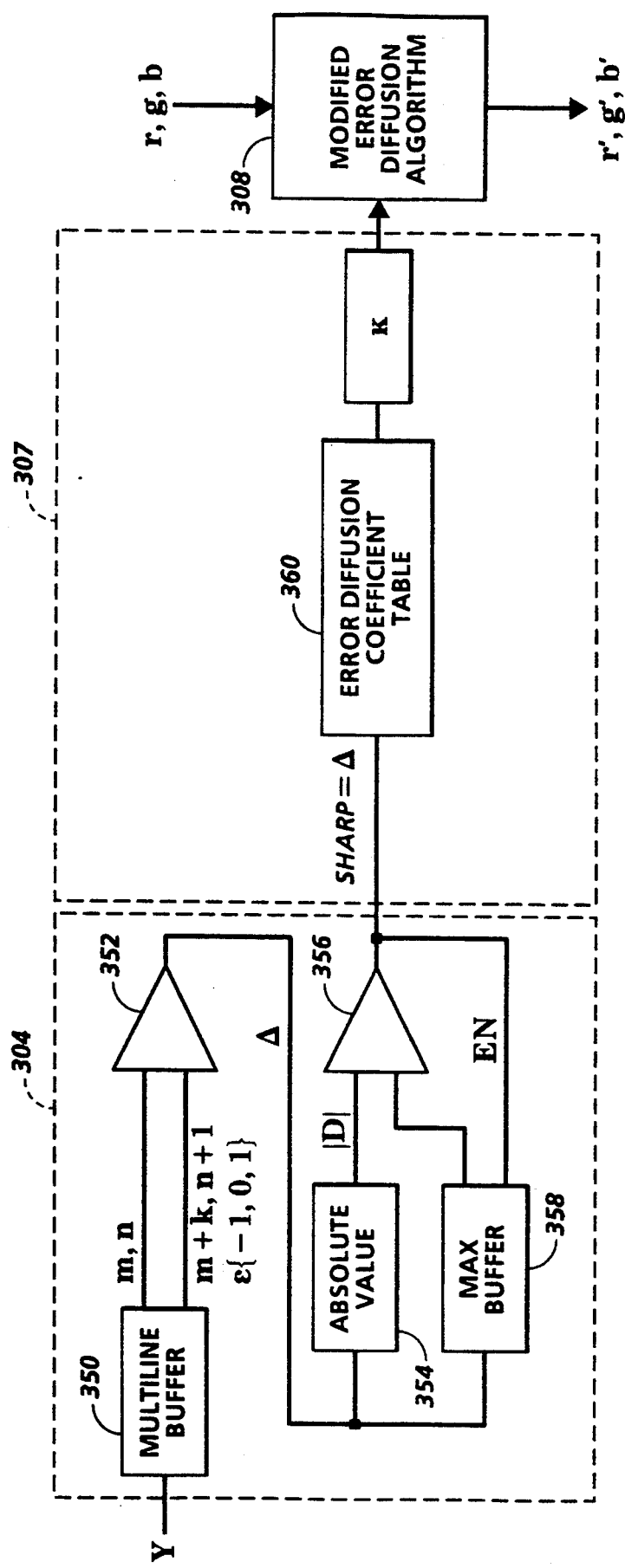

FIGS. 6 and 7 respectively show, in block diagram format, embodiments of diagram of the sharpness enhancement processor;

FIG. 8 shows a block diagram of the coefficient generator for the sharpness processor of FIG. 6; and FIG. 9 shows a block diagram of the enhancement factor for the sharpness processor of FIG. 7.

DETAILED DESCRIPTION OF THE INVENTION

Figure 1:
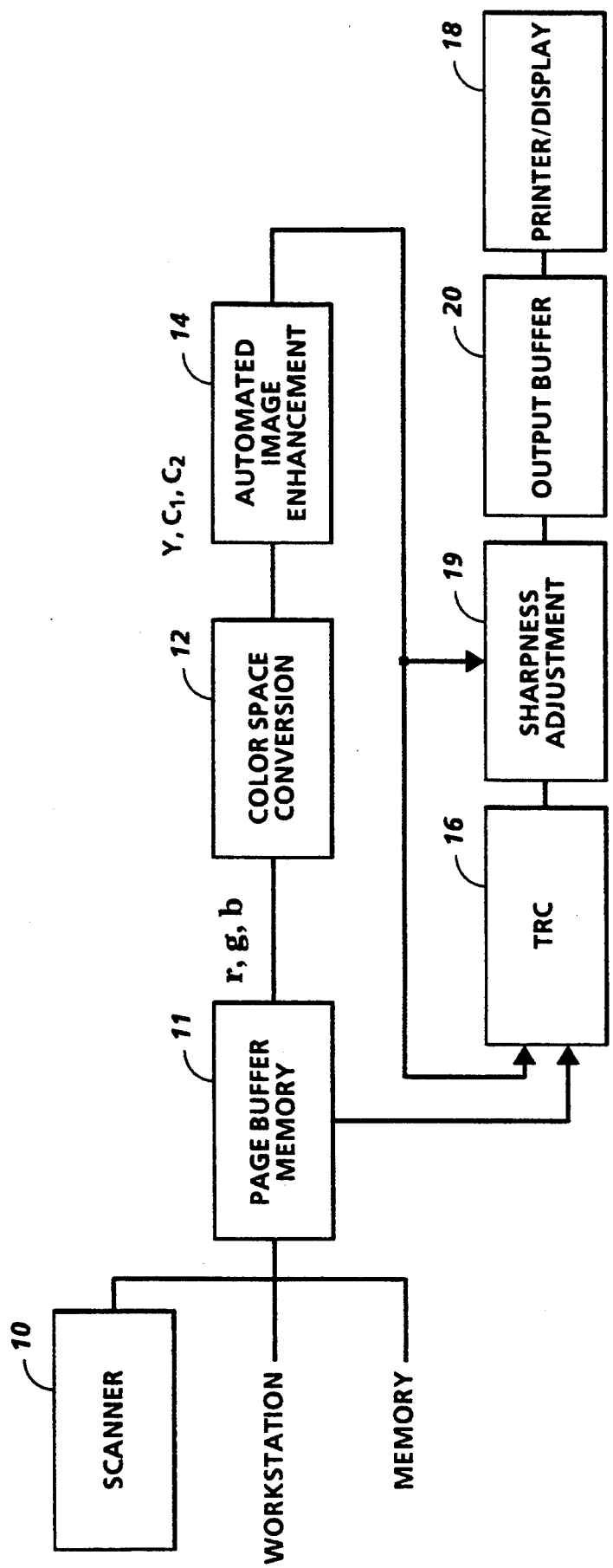
FIG. 1 shows a functional block diagram of a system employing the present invention.

Referring now to the drawings where the showings are for the purpose of describing the embodiment of the invention and not for limiting same, reference is made to FIG. 1 scan-to-print system in which the present invention may find advantageous use. A scanner 10 may conveniently be a black and white or color scanner which produces image signals defined in either RGB space for color images or density space for black and white images. The images of concern are pictorial in nature, i.e., they represent natural scenes. While certain computer generated imagery may qualify as representing nature scenes, the class of images contemplated are predominantly scanned photographs. The images themselves are defined in terms of pixels, wherein each pixel is an electrical or electronic signal with a digital gray value which varies between a white level (in the example system, a maximum) and a black level (in the example system, a minimum). In a currently desirable system, in which calculations may be done on 8 bits of information, 256 levels of gray will be available for use. Pixels are also identified in terms of position, i.e, a pixel defines a unique area m,n within the image, identified by its $m^{th}$ pixel position in a scan line, and the its nth scan line position in a page. Color is therefore represented by triplets of gray pixels for each color pixel m,n in the image, each member of the triplet of gray pixels defining the color in each separation, which together form the color pixel.

The output of a scanner 10 may be directed to an automated image enhancement system which will be further defined herein. For our purposes, the automated image enhancement system may include a segmentation system which can identify within a document a type of image, and, if desired, a descreening system, as the present invention is operative on continuous tone natural scene images. It will be assumed that the output of the automated image enhancement system that is described herein will ultimately be directed to a printer, CRT, or like device. These devices may have many characteristics and may be laser printers, ink jet printers, LED displays or CRT displays. However, they have as a common requirement the representation of gray pictorial images. This may be done with gray printing or pseudo gray printing.

In terms of deriving data for operation by the present image enhancement system, a prescan may be performed on a document placed on a copying or scanning platen and scanned by the electro-optical system of the scanner to produce a signal representing the document image. Alternatively, the image may be directed to the automated image enhancement system from a memory, having previously been scanned or derived some other system, in which case, the received image is sampled as required.

A prescan may be performed in an undersampled fashion, i.e., the image need not be sampled at the ultimate resolution of the system for the purposes of enhancement. In practice, it has been determined that a relatively small number of pixels representative of and dispersed through the entire image can accurately represent the image for this purpose. In our particular embodiment, we use a block of pixels derived from the image in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Hardware embodiments of the described inventive process might be designed not to undersample the image.

Generally, in the system in which the present invention finds use, natural scene images defined in terms of RGB space are initially directed to a color space converter 12, which converts RGB signals to a selected color space for enhancement processing, as will become apparent. Conveniently, intermediate storage of the image in the form of page buffer memory 11 may be provided, although the correction values to be described and calculated hereinafter may also be calculated in a prescanning process which does not require a page of buffering. The initial color image data initially received from scanner 10 or the like, is assumed to be in RGB space initially, i.e., red-green-blue space, and for the inventive process, must initially be converted at color space converter 12 to luminance space ($YC_1C_2$). It is possible that the image will already be in luminance space, as it is common to convert RGB values to luminance/chrominance space for other image processing. While $YC_1C_2$ space is a useful space in which the inventive process can be performed, also useful is any set of color coordinates to an expression where one term has a relationship to overall image intensity or density such as Y of Xerox YES of the "Xerox Color Encoding Standard," XNSS 289005, 1989. Whatever space is used must have a component which relates to the human visual perception of lightness or darkness. In the following example, the invention will be described using the Xerox YES color space. Experience suggests that color space conversion may be required for several functions in the overall system, and accordingly, in FIG. 1 it is shown independently of automated image enhancement. It should be noted that in some embodiments it would be sufficient to transform the RGB color data to pure intensity data for automated sharpness control, ignoring the chrominance signal if the determined correction is applied to the RGB channels. In another embodiment, the determined correction is applied to the Y-component of $YC_1C_2$ data, in which case the chrominance signal has to be maintained.

The output of color space converter 12 is processed by the automated image enhancement device 14 as will be described in more detail, which produces several image enhancement signals. One such enhancement signal might drive the TRC (tone reproduction curve) controller 16 of an output device such as printer 18. Another signal drives sharpening adjustment 19 prior to storage of the image signals to an optional output buffer 20, for subsequent transfer to printer 18 or other output device. It should be noted that the actual position of TRC controller 16 and sharpness adjustment 19 in the data path can be interchanged, provided the automated image enhancement block 14 transmits the data accordingly. It will be clear that the TRC controller 16 might work separately or integrally with a TRC controller that is commonly used to adjust the device independent data stream to the device dependent data used for printing or display. It will also be clear that the sharpness adjustment 19 might work separately or integrally with a sharpness adjustment that might be used to adjust the device independent data stream to the device dependent data used for printing or display.

Figure 2:
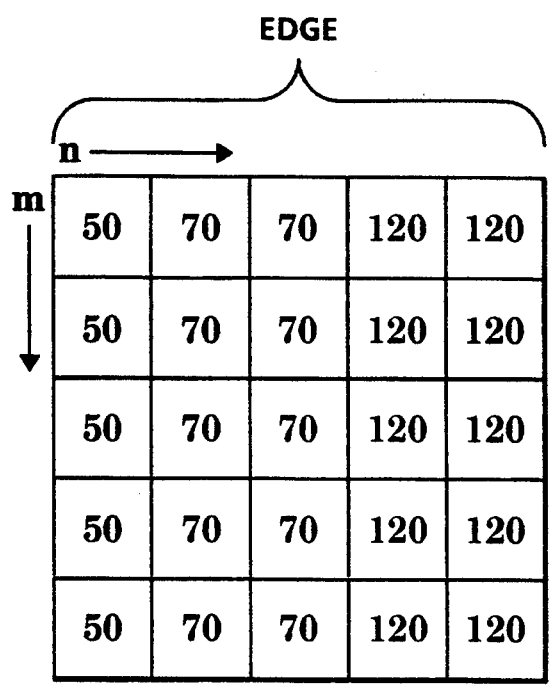
FIG. 2 shows an example input area representing the area of highest sharpness detected in the image.

Now, the principle of the present invention will be described before describing an implementation thereof. With reference now to the area of the gray picture or image in FIG. 2, if operating in a multi-bit space, such as 8-bit space, we will find that the luminance levels will be distributed between 0 and 255. FIG. 2 shows a small 5×5 area of image, showing local intensity values. For the purpose of illustration we will assume that the local image area displayed in FIG. 2 exhibits the maximum sharpness of the entire image area and that this sharpness is below a desired sharpness level. Note that natural scene images will usually have a maximum step height (difference between the gray values of adjacent pixels) of greater than approximately 100, with step heights of less than this amount tending to indicating either a serious problem with the image, or that it is not a natural scene. By contrast, at maximum step heights of approximately 220, we usually avoid any changes to sharpness as this is an acceptable step height. Note that the maximum step height of this edge is 50.

In accordance with the invention, local contrast or sharpness is examined by measuring an indicator of sharpness of the image, which will be referred to as Sharp. Sharp is given by the function:

$$\text{Sharp} = \max\{abs[i(n,m) - i(n+k, m+l)]\} \text{ for } k,l \in \{(-1,-1),(0,-1),(1,-1),(-1,0)\}$$

where $i(n,m)$ is the intensity or luminance for a given discrete area of an image at the location $(n,m)$ in the image.

Alternative value measures might include:

$$\text{Sharp}' = abs(\nabla i)$$

where $\nabla i(n,m)$ is the gradient for the luminance for the image or $$\text{Sharp}'' = \text{sobel}[i(n,m)]$$

where sobel () denotes the well known edge detection operation described e.g. in "The Image Processing Handbook", CRC Press, Boca Raton 1992, p. 124ff. It will no doubt be appreciated that different Sharp can be measured over different pixel sets, including larger sets and smaller sets.

Figure 3:
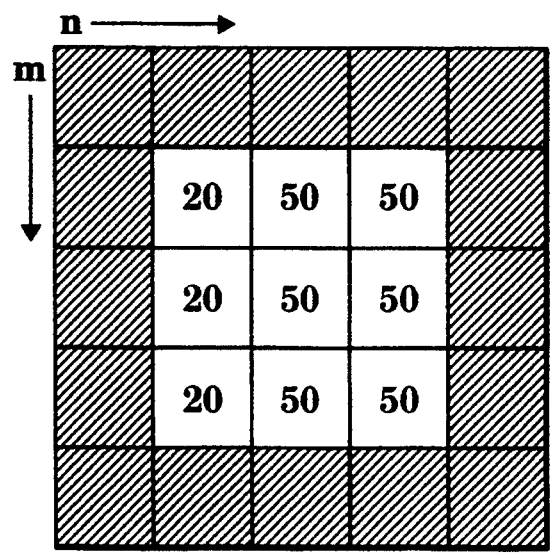
FIG. 3 shows the values for Sharp derived from FIG. 2.

FIG. 3 shows the result of using the first measure of sharpness on the image area shown in FIG. 2. The resultant Sharp signal (illustrated in FIG. 3) over a very small area is examined, and the histogram of the sharpness measure Sharp can be derived. With Sharp as a fundamental measure of sharpness, it is now possible to calculate a corresponding operation that would change sharpness to a target value.

A first method makes use of a standard sharpening filter commonly found in software or hardware applications. The measured sharpness Sharp is used to calculate a filter that transforms an idealized object of given sharpness Sharp into an idealized object or edge of sharpness target. Using the filter shown in FIG. 4 as an example for the filter to be used in the system, an ideal intensity step of Sharp (given as $\Delta$ in the equations to follow) is transferred into an intensity step of height target via $$\text{target} = (1 + 2\Delta)\Delta$$

where $\beta$ is the value of the ring pixels of the normalized filter shown in FIG. 4A.

Figure 5A:
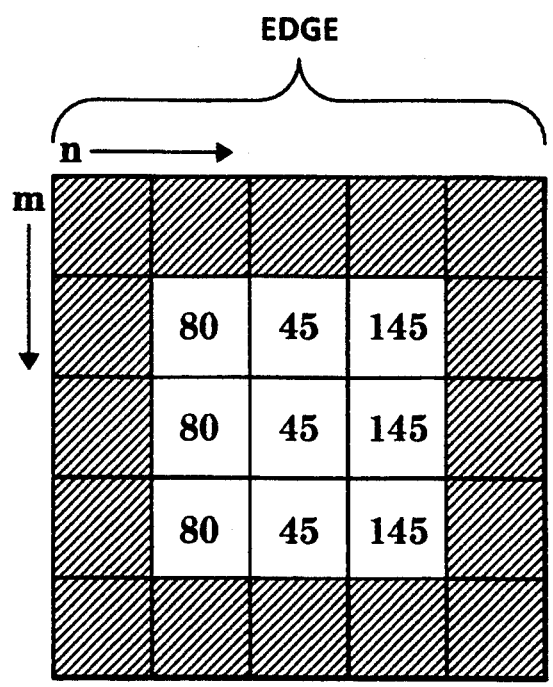
Figure 5B:
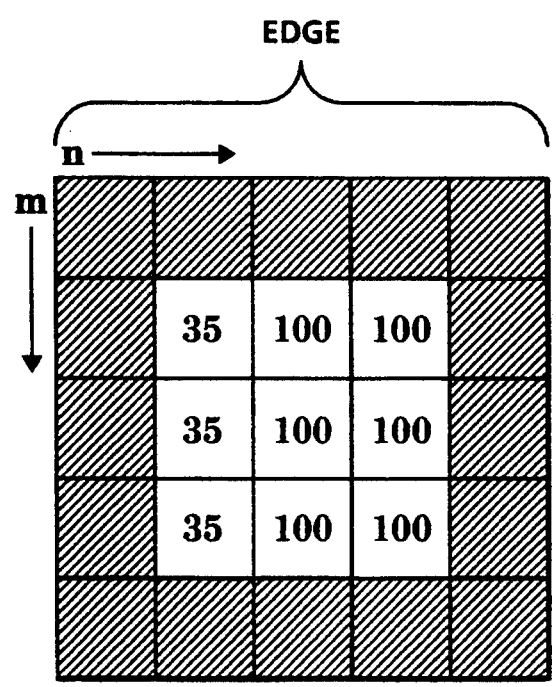
FIG. 5B shows the values for Sharp calculated for the same area.

Using as an example a target sharpness target=100 and the measured sharpness Sharp=50 from FIG. 3, $\beta$ is calculated to be $\beta = \frac{1}{2}$, as shown in FIG. 4B. Correspondingly, the center value is set to '3' in order to preserve constant area density (the sum of the values of the filter should equal 1, in order to maintain local area density). Non-local density preserving filters are possible, however. FIG. 5A shows the new intensity values for the center 3×3 region after using the filter of FIG. 4B. FIG. 5B shows the sharpness measure Sharp applied to the new intensities of the image area, giving the predicted sharpness of level '100'.

The value target is the desired sharpness that can be varied by the user, through ranges from 0 to the system maximum intensity value. The filter does not guarantee target sharpness since a calculation of sharpness based on the maximum contrast between two pixels would require a two pixel operation to generate the target value. However, for the idealized edge used to determine the filter, the target sharpness is obtained, as can be seen in FIG. 5B.

Alternatively to the calculation method described above, value Sharp may be used as an entry into a table look-up that determines the filter to be used. This can either be a complete filter description, or can be the central filter value, provided the filters have a common simple form, e.g. a 3×3 filter of the form:

$$\text{filter} = \text{const} \cdot \begin{array}{ccc} -1 & -1 & -1 \\ -1 & a & -1 \\ -1 & -1 & -1 \end{array}$$

or:

$$\text{filter} = \text{const} \cdot \begin{array}{ccc} 0 & -1 & 0 \\ -1 & a & -1 \\ 0 & -1 & 0 \end{array}$$

with 'a' being determined by the table look-up. It should be noted that the second filter is identical to the filter shown in FIG. 4B, except for a renormalization constant.

A second embodiment makes use of the edge enhanced error diffusion process described in U.S. Pat. No. 5,045,952 to Eschbach, incorporated by reference herein for the sharpening. In this case, the threshold modulation term $\kappa$ is selected via a table look-up based on the value Sharp. This method is specially advantageous in situations, where a reduction of the data from N-bit to n-bit (N>n) is required, as in the case of converting 8 bit to 1 bit or 10 bit to 8 bit, etc. In the environment of FIG. 1, this might allow to combine the sharpening operation with the actual halftoning, resulting in improved software performance, or it might enable the internal use of 10 bit TRCs to reduce truncation errors using multiple TRCs, while still preserving an 8 bit output.

In both methods using a table look-up to determine the filter or edge enhancement coefficient, a simple method exists to load the look-up table. In this method an edge of varying sharpness is operated on by a given filter and a simple examination of the resultant sharpened edge determines the input/output relationship of edge height for that filter. Several filters are used to determine the relationships and intermediate sharpness values can be obtained by simple interpolation of the determined filter values. The same concept holds for the determination of the edge enhancement coefficient for the modified error diffusion process.

It is important to notice that multiple estimations of Sharp can be used and combined into a final Sharp$_{mod}$. The above method determined the filter based on the desire to translate the maximum measure sharpness value to a desired target value. An alternative is to also determine the filter that would translate 5% of the image edges into a target value for those 5%. Those estimates can then be combined to form a final value Sharp$_{mod}$.

It is also important to note that repeated application of this procedure does not further "sharpen" the image beyond desirability. Instead, images converge on a representation of sharpness that is considered sharp. This can be understood by looking at the sharpness measure $\Delta$: after sharpening, $\Delta$ will have increased, and any subsequent attempt at sharpening will use the new $\Delta$, which will be much closer to target than old sharpness $\Delta$, in the limit being equal to target, thereby converging to a final sharpness of the image. This holds true for implementing the sharpness via a table look-up and a calculated filter.

Now looking at each process function of the implemented automated image enhancement device and with reference now to FIG. 6, sharpness adjustment may be accomplished as shown. Initially and optionally, the image is TRC corrected so that the high frequency elements of the image are globally corrected for contrast and/or exposure, prior to sharpness correction at TRC correction 200. Next, local sharpness $\Delta$ is estimated from the image at sharpness estimation 204. Sharpness estimation $\Delta$ is optionally modified using multiple sharpness estimations at modifier 206 to derive $\Delta_{mod}$. One possible modification is to calculate $\Delta$ at the maximum step height, and at the 5% step height (the minimum height of the largest 5% of step heights). We may select one or the other or a combination of the calculated $\Delta$'s to increase sharpness. The output value of $\Delta$ is used at coefficient calculation 207, in order to derive the filter coefficients for the sharpness filter. A 3×3 filter has been selected in this implementation for convenience, although experience shows that other small area filters, e.g. 5×5, including asymmetric filters, can function as substitutes.

With reference to FIG. 7, in another embodiment similar to that shown in FIG. 6, sharpness adjustment may be accomplished as shown. Initially and optionally, the image is TRC corrected so that the high frequency elements of the image are globally corrected for contrast and/or exposure, prior to sharpness correction at block 300. Next, local sharpness $\Delta$ is estimated from the image at sharpness estimation 304. Sharpness estimation $\Delta$ is optionally modified using multiple sharpness estimations at modifier 306 to derive $\Delta_{mod}$. The output value of $\Delta$ is used as an entry into a table look-up stored at look up table memory 307 to yield either the filter coefficients or the $\kappa$ coefficient for the edge enhanced error diffusion algorithm.

With reference now to FIG. 8, sharpness estimation 204, employs a multi scan line buffer 250 which stores sufficient image data to determine the local area sharpness or Sharp. A comparator arrangement 252 determines for each location m,n within a small area defined about m,n and stored in buffer 250 the difference D in intensity between m,n and m+k, n+l $\{(k,l)=(-1,-1),(0,-1),(1,-1),(-1,0)\}$ (the area or window about m,n). The absolute value $|D|$ of difference D, is determined at absolute value circuit 254, and compared to previous maximum determinations at comparator 256. If the current value of $|D|$ is a maximum, its storage in max buffer 258 is enabled with signal EN from comparator 256. Upon completion, the Sharp=$\Delta$ is directed to coefficient calculation 207, where $\Delta$ is used with an externally applied value for target, to calculate $\alpha$ and $\beta$. In the example of FIG. 8, the filter type shown in FIG. 4A was assumed.

Alternatively, in FIG. 9, the embodiment employs a multi scan line buffer 350 which stores sufficient image data to determine the local area sharpness or Sharp. A comparator arrangement 352 determines for each location m,n within a small area defined about m,n and stored in buffer 350 the difference D in intensity between m,n and m+k, n+l $\{(k,l)=(-1,-1),(0,-1),(1,-1),(-1,0)\}$ (the area or window about m,n). The absolute value $|D|$ of difference D, is determined at absolute value circuit 354, and compared to previous maximum determinations at comparator 356. If the current value of $|D|$ is a maximum, its storage in max buffer 358 is enabled with signal EN from comparator 356. Upon completion, the Sharp=$\Delta$ is directed to a look-up table stored in memory 360 for retrieving of the desired filter or edge enhancement coefficient κ. The coefficient κ is then used in the edge enhancing error diffusion processor 358 described in U.S. Pat. No. 5,045,952 to Eschbach, incorporated by reference. It will no doubt be recognized that this error diffusion process is a different type of filter than that described for the earlier embodiments, but it nonetheless accomplishes the same functions.

It should be noted that the described inventive process can be used to derive the necessary sharpness operation applied to the intensity component of the image. Alternative implementations might elect to apply the calculated sharpness correction directly to the color components of the image, e.g. red, green, and blue components. The sharpness parameter might be determined using a histogram of the image sharpness measures.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. Apparatus for altering the sharpness in the reproduction of an electronically encoded natural scene image, comprising:
   a) an electronic signal input suitable for receiving an electronically encoded natural scene image, where the encoding is in terms of color density signals;
   b) a color space conversion circuit, converting the color density signals to a format wherein at least one signal represents image intensity and is defined for L levels of intensity;
   c) a comparator iteratively comparing intensity signals for a predetermined area of the image to determine a measure of sharpness of the image and producing an output signal indicative thereof.
   d) a sharpness filter coefficient deriving circuit, having an external signal input receiving desired sharpness signals from a user, and deriving filter coefficients as a function of the comparator output signals and desired sharpness;
   e) a sharpness filter, operating on one of the color density encoded image signals or converted color density signals, to sharpen the image;
   f) returning the image to an output encoding, if required, preparatory to output.

2. The apparatus of claim 1 wherein the measure of sharpness is given by a maximum local sharpness measured for the image.

3. The apparatus of claim 2 wherein the maximum local measure of sharpness is given by maximum local contrast over a small image window.

4. The apparatus of claim 3 wherein the window is given by the relative pixel positions $\{(-1,0),(0,-1)\}$.

5. The apparatus of claim 3 wherein the window is given by the relative pixel positions $\{(-1,-1),(-1,0),(-1,1),(0,-1)\}$.

6. The apparatus as defined in claim 1 including the additional step of modifying sharpness as a function of a plurality of sharpness measurements.

7. The apparatus as defined in claim 1 wherein color density signals are in terms of red, green and blue colors.

8. The apparatus as defined in claim 1 wherein image intensity is in terms of luminance.

9. A method of altering the sharpness in the reproduction of an electronically encoded natural scene image, comprising the steps of:
   a) receiving an electronically encoded natural scene image, where the original encoding is in terms of color density signals;
   b) converting the color density signals to a format wherein at least one signal represents image intensity and is defined for L levels of intensity;
   c) comparing intensity signals for a predetermined area of the image to determine a maximum local measurement of sharpness for the image;
   d) using determined maximum local area sharpness measurement as an input to a look-up table in device memory, to retrieve predetermined filter coefficient values mapped to said maximum local area sharpness measurement;
   e) filtering the color density signals with a sharpness filter operating in accordance with the predetermined filter coefficient values to derive a sharpened image.

10. The method of claim 9 wherein the measure of sharpness is given by a maximum local sharpness measured for the image.

11. The method of claim 10 wherein the maximum local measure of sharpness is given by maximum local contrast over a small image window.

12. The method of claim 11 wherein the window is given by the relative pixel positions $\{(-1,0),(0,-1)\}$.

13. The method of claim 11 wherein the window is given by the relative pixel positions $\{(-1,-1),(-1,0),(-1,1),(0,-1)\}$.

14. The method as defined in claim 9 including the additional step of modifying sharpness as a function of a plurality of sharpness measurements.

15. The method as defined in claim 9 wherein the filter is derived using the measured sharpness and a desired sharpness using an idealized image edge.

16. The method as defined in claim 9 including the additional step of modifying maximum local area sharpness as a function of a plurality of maximum local area sharpness measurements.

17. The method as defined in claim 9 wherein color density signals are in terms of red, green and blue colors.

18. The method as defined in claim 9 wherein image intensity is in terms of luminance.

19. Apparatus for altering the sharpness in the reproduction of an electronically encoded natural scene image, comprising:
   a) an electronic signal input suitable for receiving an electronically encoded natural scene image, where the encoding is in terms of color density signals;
   b) a color space conversion circuit, converting the color density signals to a format wherein at least one signal represents image intensity and is defined for L levels of intensity;
   c) a comparator comparing intensity signals for a predetermined area of the image to determine a measurement of sharpness and producing an output signal indicative of the determined sharpness for the image;
   d) a sharpness filter coefficient memory, addressable by values derived at the comparator to retrieve predetermined filter coefficient values mapped to said maximum local area sharpness measurement;
   e) a sharpness filter, operating with the retrieved filter coefficient values on one of the color density encoded image signals or converted color density signals, to sharpen the image.

20. The apparatus of claim 19 wherein the measure of sharpness is given by a maximum local sharpness measured for the image.

21. The apparatus of claim 20 wherein the maximum local measure of sharpness is given by maximum local contrast over a small image window.

22. The apparatus of claim 21 wherein the window is given by the relative pixel positions $\{(-1,0),(0,-1)\}$.

23. The apparatus of claim 22 wherein the window is given by the relative pixel positions $\{(-1,-1),(-1,0),(-1,1),(0,-1)\}$.

24. The apparatus as defined in claim 19 including a sharpness modification circuit, modifying maximum local area sharpness as a function of a plurality of maximum local area sharpness measurements.

25. The method as defined in claim 19 wherein color density signals are in terms of red, green and blue colors.

26. The method as defined in claim 19 wherein image intensity is in terms of luminance.

27. Apparatus for altering the sharpness in the reproduction of an electronically encoded natural scene image, comprising:
   a) an electronic signal input suitable for receiving an electronically encoded natural scene image, where the encoding is in terms of k-bit color density signals;
   b) a color space conversion circuit, converting the color density signals to a format wherein at least one signal represents image intensity and is defined for L levels of intensity;
   c) a comparator comparing intensity signals for a predetermined area of the image to determine a measurement of sharpness and producing an output signal indicative thereof for the image;
   d) a enhancement factor memory, addressable by values derived at the comparator to retrieve predetermined enhancement factor values mapped to said maximum local area sharpness measurement;
   e) an error diffusion circuit, comparing color density signals to a threshold, said threshold set for each pixel as a function of the retrieved enhancement factor, said circuit providing as an output I-bit color density signals, where $I<k$ and the image is sharpened.

28. The method of claim 27 wherein the measure of sharpness is given by a maximum local sharpness measured for the image.

29. The method of claim 28 wherein the maximum local measure of sharpness is given by maximum local contrast over a small image window.

30. The method of claim 29 wherein the window is given by the relative pixel positions $\{(-1,0),(0,-1)\}$.

31. The method of claim 29 wherein the window is given by the relative pixel positions $\{(-1,-1),(-1,0),(-1,1),(0,-1)\}$.

32. The apparatus as defined in claim 27 including a sharpness modification circuit, modifying maximum local area sharpness as a function of a plurality of maximum local area sharpness measurements.

33. The method as defined in claim 27 wherein color density signals are in terms of red, green and blue colors.

34. The method as defined in claim 27 wherein image intensity is in terms of luminance.

35. A method of altering the sharpness in the reproduction of an electronically encoded natural scene image, comprising the steps of:
   a) receiving an electronically encoded natural scene image, where the original encoding is in terms of k-bit color density signals;
   b) converting the color density signals to a format wherein at least one signal represents image intensity and is defined for L levels of intensity;
   c) comparing intensity signals for a predetermined area of the image to determine a maximum local area measurement of sharpness for the image;
   d) retrieving from an enhancement factor memory predetermined enhancement factor values using as an address to said memory said maximum local area sharpness measurement;
   e) halftoning the color density signals with a threshold, said threshold set for each pixel as a function of the retrieved enhancement factor, and providing as an output l-bit color density signals, where $I<k$ and the image is sharpened.

36. The method of claim 35 wherein the measure of sharpness is given by a maximum local sharpness measured for the image.

37. The method of claim 36 wherein the maximum local measure of sharpness is given by maximum local contrast over a small image window.

38. The method of claim 37 wherein the window is given by the relative pixel positions $\{(-1,0),(0,-1)\}$.

39. The method of claim 37 wherein the window is given by the relative pixel positions $\{(-1,-1),(-1,0),(-1,1),(0,-1)\}$.

40. The method of claim 35 wherein the halftoning method used is an edge enhanced error diffusion process.

* * * * *